Oct. 12, 1954 — R. LAIDLAW — 2,691,528
CHANCE-CONTROLLED GAME DEVICE
Filed Nov. 1, 1951
Fig. 1
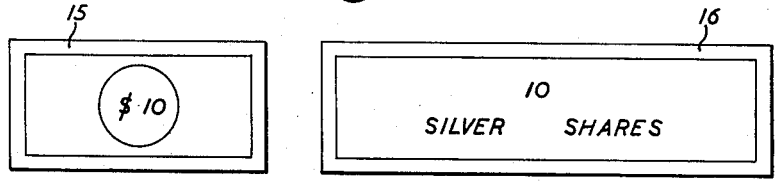
Fig. 2     Fig. 3
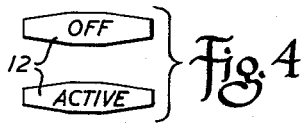    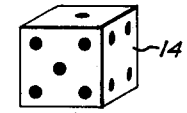    
Fig. 4     Fig. 5     Fig. 6
Inventor
RONALD LAIDLAW
by: Fetherstonhaugh & Co.
Att'ys.

Patented Oct. 12, 1954

2,691,528

UNITED STATES PATENT OFFICE 2,691,528

CHANCE-CONTROLLED GAME DEVICE

Ronald Laidlaw, Hamilton, Ontario, Canada

Application November 1, 1951, Serial No. 254,290

2 Claims. (Cl. 273—134)

This invention relates to a game of speculation and skill.

In the past quite a number of games of speculation and skill have been devised in which the participants buy and sell various tokens in the expectation that their game value will rise, the rise or fall of the game value being controlled by a game piece operated by the players. I feel that I have devised a game which incorporates in combination a number of elements that have not previously combined, and which, when combined, provide an exciting and novel game of this general nature.

In my game illustrated herein I simulate a rising or falling stock market and to do this I employ in combination a playing area having a series of value scales marked thereon, each of the scales being identified by the name of a stock, a value indicator marker means for each of the said scales to indicate a value on the scale, a second playing area marked off in a series of defined areas marked in various ways to relate them to the value scales, and a marker for movement around the defined areas on the second playing area in accord with the indications of a game piece operable by the players to control the movement of the marker means on the value scales. Stock certificates for each of the scales on the playing area and a stock of stage money that can be exchanged for them are also provided according to the invention. In use the various players take the game piece in turn and operate it to control the movement of the second-mentioned marker means around the playing area. The defined areas on the second playing area are marked to relate them to the values of the first playing area and to cause the marker means on the first playing area to go up or down the value scales. This changes the value of the certificates which are, in accordance with the game rules, purchased and sold by the players. The invention will be clearly understood after reference to the following detailed specification, read in conjunction with the drawings.

In the drawings,

Figure 1 is a view of a game board having playing areas, according to the invention.

Figure 2 shows a piece of stage money employed as a value certificate in the game.

Figure 3 shows a silver share certificate employed as a token in the game.

Figure 4 illustrates two sides of a value indicating marker for use on the value scales.

Figure 5 is a die employable as a game piece.

Figure 6 is a view of a marker means for the playing area that dictates the value of the share certificates in the game.

Referring to the drawings, the letter A generally indicates a composite game board according to the invention. The composite board A really in actual fact incorporates two co-operating playing areas, one a playing area 10 having a series of value scales marked thereon, each of which is identified by a name representing a marketable commodity such as gold, silver, oil, zinc, copper and rubber, and two, a second playing area 11 which extends around the playing area 10 and is marked off into a series of defined areas which carry various markings to relate them to the value scales of board 10. For example, the markings of the value scale 11, starting in the lower lefthand corner, are rubber active, copper active, zinc active, collect $300.00, zinc+2—, rubber+3—.

Each of the value scales on the playing area 10 has a value indicating marker 12 formed with two standing surfaces so that when the marker is stood on one surface an indication of "Off" is visible and when the marker is stood on the other surface an indication of "Active" is visible. In the drawings, the gold, oil, zinc and rubber markers are disposed with the "Off" visible and the silver and copper indicators show the "Active" visible. The side of the indicator that shows governs the direction in which the value indicator marker moves on the scale as will be more fully explained later.

A marker 13 for movement around the defined areas of the playing area 10 is also provided. It moves from defined area to defined area as indicated controlled by the throwing of a game piece such as a die 14.

Also for use with the game I have stage money indicated by the numeral 15 and value or share certificates indicated by the numeral 16 for each of the commodities appearing on the playing area or scale 10.

I employ the novel combination of game elements described above in the following way. Any number of players can participate in the playing of my game. At the beginning of the game each player is given an arbitrary amount of the stage money 15 with which he is free to purchase share certificates 16 in any of the various commodities appearing on the playing area 10 according to rules of the game. Each player takes the die 14 in turn and throws it. At each throw of the die, the marker 13 is moved ahead in a clockwise direction the number of spaces on the playing area 11 that corresponds to the number that turns up on the die. Depending upon where the marker 13 stops the values of the stock appearing on playing area 10 change. For example, if the marker were to stop on rubber+3—, the rubber stock would rise or fall 3 points from the place where the marker 12 was located prior to the throwing of the die depending upon whether the marker 12 showed "Active" or "Off." If it were "Active," the rubber stock would go up in value 3 points; if it were "Off" the rubber stock would go down in value 3 points.

There are, of course, other markings on the series of areas on the playing area 11. For example, there is "Gold active." If the marker 13 were to land on "Gold active" and at the time the gold marker 12 read "Gold off," the gold marker 12 would be turned over to indicate "Gold active." The reverse would happen if the marker 13 landed on "Gold off" and at the time the gold marker read "Gold on." The other commodities on the playing area 10 also have related defined areas in the series of defined areas on the playing area 11.

If the marker lands on a defined area marked "Steady" the values on the playing area 10 are unchanged. It will also be observed that there are "Bonus" defined areas on the playing area 11 if a particular player throws the die to land the marker 13 on one of these areas he collects from the bank the designated amount. For example, four areas up from the lower left-hand corner of the playing area 11 is a designation "Collect $300." If a player landed the marker 13 here he would be entitled to receive $300. from the bank.

All stocks at the beginning of the game start at the value $10 per share and with the indicator 12 pointing "Active." All players at this time have the privilege of buying as many of the various stocks as they wish. After the game has started however, a player can only buy stocks when he throws the die and the marker 13 falls in a "Speculate" square on the playing area 11.

If during play the value of a stock drops to "Zero" it becomes worthless and the players must hand their shares in to the bank. If the shares reach the value of 25 all players holding that particular stock must sell it to the bank for $25. plus a bonus if desired. In either case the stock then appears on the market again at $10. a share and players again have the privilege of buying as much as they wish.

Players can buy and sell stocks among themselves as they see fit.

What I claim as my invention is:

1. In a game the combination of; a composite board comprising; a playing area having a series of value scales marked thereon, each of said scales being identified by a name, individual value indicating marker means for each of said scales to indicate a particular value on said scale, a second playing area marked off with a series of defined areas, said defined areas being marked in various ways to relate them to said value scales, marker means for movement on said defined areas on said second playing area, a game piece operable by a player to indicate the extent of movement of said marker means for said second playing area around said series of defined areas marked thereon whereby to indicate the movement of said marker means on said value scales, a stock of tokens for each of said scales on said first mentioned playing area, the value of said tokens for each of said scales being indicated by the position of said value indicating marker means on said value scales on said first-mentioned playing area, and a stock of value certificates that can be exchanged for said tokens.

2. In a game the combination of game elements as claimed in claim 1 in which said value indicating marker means comprises; an indicator having two resting surfaces, said indicator being marked to indicate that the token should move in one direction on the playing area when it rests on one of said surfaces and to indicate that it should move in the other direction when it rests on the other of said surfaces.

References Cited in the file of this patent.

UNITED STATES PATENTS

| Number | Name | Date |
|---|---|---|
| 1,760,287 | Schippers | May 27, 1930 |
| 2,174,058 | McGennis | Sept. 26, 1939 |
| 2,177,078 | Raizen | Oct. 24, 1939 |
| 2,178,330 | Thomas | Oct. 31, 1939 |
| 2,209,117 | Garrett | July 23, 1940 |